March 20, 1928.
H. G. HERSHMAN ET AL
1,663,452
WHEEL ALIGNING DEVICE
Filed May 14, 1927
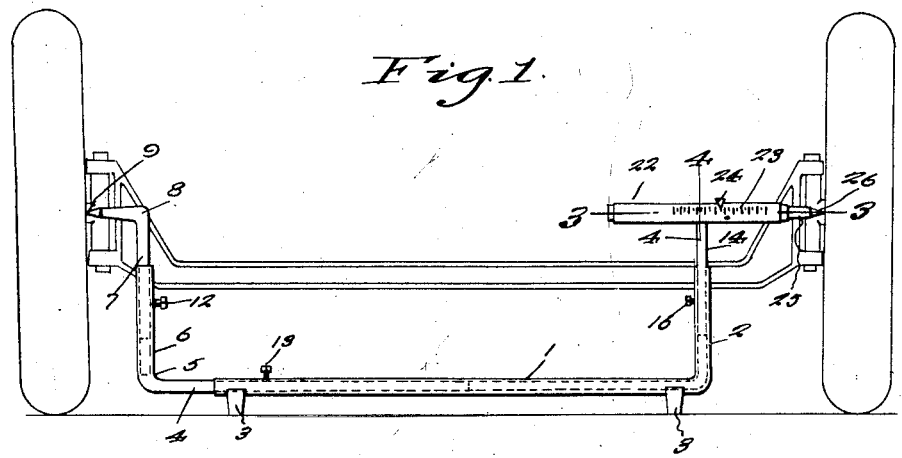
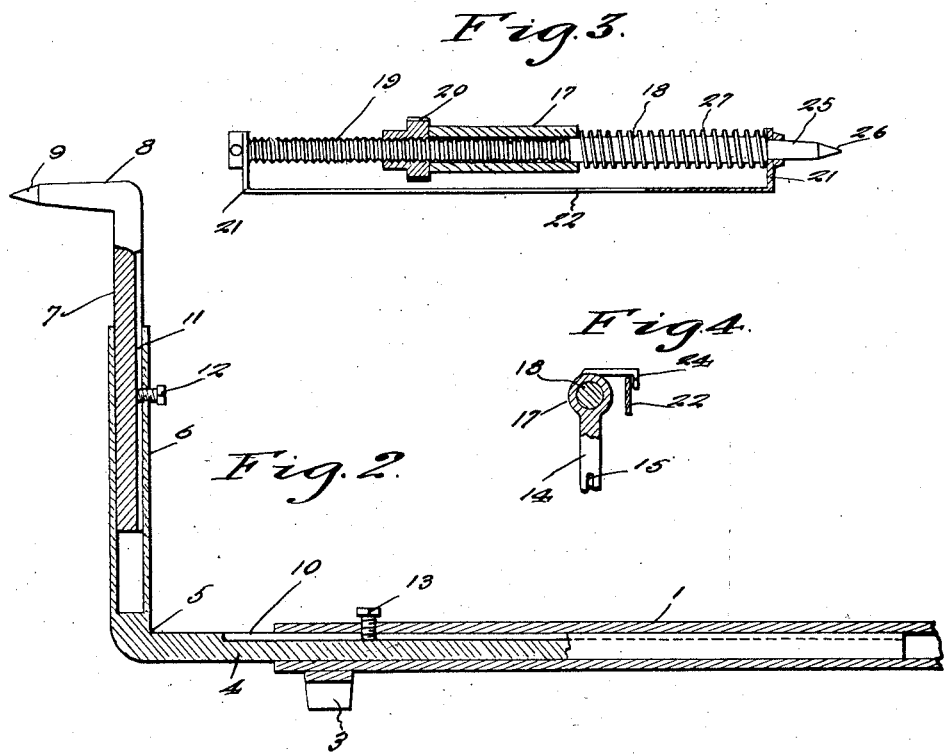
WITNESS:
R. A. Thomas
Helen G. Hershman
Frank Hershman  INVENTOR
BY Victor J. Evans
ATTORNEY Patented Mar. 20, 1928.

1,663,452

UNITED STATES PATENT OFFICE.

HELEN GENEVA HERSHMAN AND FRANK HERSHMAN, OF MILLER, SOUTH DAKOTA.

WHEEL-ALIGNING DEVICE.

Application filed May 14, 1927. Serial No. 191,385.

This invention relates to geometrical instruments and its general object is to provide a wheel aligning gage primarily designed for aligning the wheels of a motor vehicle and the like in an efficient and expeditious manner and with very little effort on the part of the operator.

Another object of the invention is to provide a wheel aligning gage that is capable of being operated with extreme accuracy, with the result that correct and positive gaging as well as proper alignment of the wheels will be assured.

A further object of the invention is to provide a vehicle wheel aligning tool that is capable of adjustment so that it can be readily used on all types of vehicle wheels, is simple in construction, contains few parts, and is inexpensive to manufacture.

This invention also consists in certain other features of construction and in the combination and arrangement of the several parts, to be hereinafter fully described, illustrated in the accompanying drawings and specifically pointed out in the appended claims.

In describing our invention in detail, reference will be had to the accompanying drawings wherein like characters denote like or corresponding parts throughout the several views, and in which:

Figure 1 is a front elevation of our wheel aligning gage and showing the same in use and applied to the front wheels of a vehicle.

Figure 2 is a fragmentary longitudinal sectional view taken through a portion thereof.

Figure 3 is a sectional view taken on line 3—3 of Figure 1.

Figure 4 is a sectional view taken on line 4—4 of Figure 1.

Referring to the drawings in detail the reference numeral 1 indicates the body of the gage and which as shown in Figure 1 is formed in tubular formation and has one end bent at right angles to provide an upright portion 2. Extending from adjacent the opposite ends of the horizontal portion of the body are feet 3 which support and elevate the body a suitable distance as shown in Figure 1 of the drawings.

Telescopically mounted within the horizontal portion of the body is one arm 4 of a substantially right angle shaped member 5 which has its other arm indicated by the reference numeral 6 and is hollow for the purpose of slidably receiving the shank 7 of a member 8 which has its end tapered to a point as at 9 for a purpose which will be presently apparent.

The shank of the member 8 as well as the arm 4 of the right angle shaped member 5 are each provided with a longitudinally disposed groove indicated respectively by the reference numerals 10 and 11, and threadedly mounted in the arm 6 is a set screw 12 adapted to be received in said groove 11 for clamping the member 8 at any desired height, while the set screw 13 is threadedly secured in the body 1 and is adapted for clamping the member 5 in any desired adjusted position with respect to the body.

Mounted for vertical adjustable movement in the upright 2 is a stem 14 which is likewise provided with a longitudinal groove 15 as well as recesses not shown to accommodate a set screw 16.

The stem has integrally formed with or otherwise secured to its upper end, a sleeve 17 slidably receiving a rod 18 which is threaded for a portion of its length as at 19 to receive a flanged adjusting nut 20 having serrations on its outer surface to provide a positive finger engaging means. In order to limit the slidable movement of the rod 18, through the sleeve 17, the rod has secured adjacent its opposite ends the parallel arms 21 of a substantially U-shaped elongated member 22 which has formed on the outer face of its bight portion graduations 23 which cooperate with a pointer 24 formed integral with or otherwise secured to one end of the sleeve 17. The rod 18 is adjustable through the sleeve by rotation of the nut 20 as will be apparent, and one end of the rod is reduced as at 25 and this reduced portion terminates in a pointed end 26 which cooperates with the point 9 of the member 8 when aligning the wheels. Surrounding the rod 18 and having its end convolutions engaging one end of the sleeve 17 and the adjacent arm 21 of the substantially U-shaped member 22 is a coil spring 27 which disposes the sleeve in contacting engagement with the nut 20 as best shown in Figure 3 of the drawings.

From the above description and disclosure of the drawings, it will be obvious that the wheel aligning gage which forms the subject matter of the present invention is capable of adjustment for all type vehicles and will perform its intended function in an efficient and accurate manner with very little effort on the part of the operator. To properly align the wheels of a vehicle, the tool is disposed between the wheels as shown in Figure 1 of the drawings and the member 8 and shank 14 are adjusted to their proper height. The point 9 is disposed in contacting engagement with the felly of the adjacent wheel as shown, and the nut 20 is rotated on the threads of the rod 19 until the desired distance is reached which can be readily seen upon inspection of the pointer 24 with respect to the graduations 23, with the result the condition of the wheels can be ascertained at a glance and corrected if necessary.

It is thought from the foregoing description that the advantages and novel features of our invention will be readily apparent.

We desire it to be understood that we may make changes in the construction and in the combination and arrangement of the several parts, provided that such changes fall within the scope of the appended claims.

What we claim is:

1. A wheel aligning gage of the character described comprising a tubular body, feet depending therefrom for supporting the same, a tubular upright formed with one end of said body, a right angle shaped member telescopically mounted in the opposite end of the body, means for adjustably securing said member with respect to said body, a pointed member including a shank mounted for vertical adjustment in said right angle disposed member, a sleeve mounted for vertical adjustment in said tubular upright, a threaded rod slidable through said sleeve and terminating at one end in a point adapted to cooperate with the point of the pointed member, a nut carried by said threaded rod, and resilient means for retaining said nut in contacting engagement with one end of said sleeve for the purpose specified.

2. A gage of the character described comprising a tubular body, an upright formed therewith, a sleeve having a shank received in said upright for adjustable movement therein, a rod having a threaded portion and mounted for slidable movement through said sleeve, a substantially U-shaped elongated member having its arms fixed adjacent the ends of said rod to limit movement of said rod through said sleeve, a nut carried by the threaded portion of said rod for adjusting the same through the sleeve, resilient means for retaining said nut in contacting engagement with said sleeve, said rod having a pointed end, and means cooperating with said pointed end and carried by said body for aligning the wheels of a vehicle.

3. A gage of the character described comprising a body, means telescopically mounted in one end of said body, pointed means adjustably associated with the first mentioned means, an upright formed with said body, a sleeve, a shank formed with said sleeve and being telescopically mounted in the upright for cooperative adjustment with said pointed means, a rod mounted for slidable movement through said sleeve and provided with a threaded portion, a substantially elongated U-shaped member having its arms fixed adjacent the ends of the rod, and being provided with graduations on its face, a nut carried by the threaded portion of said rod for moving the rod through said sleeve, a coil spring surrounding said rod for retaining said nut in operative position, a pointer carried by said sleeve and cooperating with said graduations and said rod having its outer end pointed for cooperation with said pointed member for aligning the wheels of a vehicle.

4. A wheel aligning gage of the character described comprising a body, feet for said body, means adjustable longitudinally in one end of said body and including a hollow portion, a pointed member mounted for adjustment in said means, an upright formed with the opposite end of said body, a sleeve, a stem depending from said sleeve and mounted for adjustment in said upright, and pointed means adjustably mounted in said sleeve and cooperating with the pointed member as and for the purpose specified.

In testimony whereof we affix our signatures.

HELEN GENEVA HERSHMAN.
FRANK HERSHMAN.